(12) United States Patent
Kulas et al.

(10) Patent No.: US 10,710,516 B2
(45) Date of Patent: Jul. 14, 2020

(54) MOTOR VEHICLE MOULDING RING MADE FROM ALUMINIUM/MAGNESIUM ALLOY

(71) Applicant: CONSTELLIUM SINGEN GMBH, Singen (DE)

(72) Inventors: Mary-Anne Kulas, Voreppe (FR); Andreas Afseth, Coublevie (FR); Volkmar Gillich, Neuhausen (CH)

(73) Assignee: CONSTELLIUM SINGEN ROLLED PRODUCTS GMBH, Singen (DE)

( * ) Notice: Subject to any disclaimer, the term of this patent is extended or adjusted under 35 U.S.C. 154(b) by 1111 days.

(21) Appl. No.: 14/896,691

(22) PCT Filed: Jun. 13, 2014

(86) PCT No.: PCT/IB2014/001583
§ 371 (c)(1),
(2) Date: Dec. 8, 2015

(87) PCT Pub. No.: WO2014/203077
PCT Pub. Date: Dec. 24, 2014

(65) Prior Publication Data
US 2016/0129853 A1    May 12, 2016

(30) Foreign Application Priority Data

Jun. 17, 2013 (FR) ..................... 13 01401

(51) Int. Cl.
*B60R 13/02* (2006.01)
*C22F 1/047* (2006.01)
(Continued)

(52) U.S. Cl.
CPC .............. *B60R 13/02* (2013.01); *C21D 1/60* (2013.01); *C21D 1/613* (2013.01); *C21D 8/0226* (2013.01);
(Continued)

(58) Field of Classification Search
USPC ........................................... 148/552
See application file for complete search history.

(56) References Cited

U.S. PATENT DOCUMENTS 5,714,019 A    2/1998    Sanders et al.

FOREIGN PATENT DOCUMENTS

| DE | 102007057777 A1 | 6/2009 |
| EP | 0507411 A1 | 10/1992 |
| JP | 2006045638 A | 2/2006 |

OTHER PUBLICATIONS

Rooy, Elwin. "Aluminum Alloy Ingot Casting and Continuous Processes." ASM Handbook. vol. 15. Published Dec. 1, 2008. (Year: 2008).*

(Continued)

*Primary Examiner* — Brian D Walck
(74) *Attorney, Agent, or Firm* — McBee Moore & Vanik IP, LLC

(57) ABSTRACT

The invention relates to a method of manufacturing an outside decorative trim strip of a motor vehicle, such as window surrounds or body shell trim, made of aluminum alloy, by shaping and brightening of a plate or strip made by vertical continuous casting of an alloy slab of series AA5xxx of high purity, homogenization-heating of the slab, hot rolling, cooling, cold rolling with intermediate annealing in a continuous tunnel furnace, or holding between the solvus temperature and the alloy burning temperature typically for 3 seconds to 5 minutes, quenching in air or water, possible annealing at a temperature of 100 to 200° C.
The invention also relates to a decorative trim strip of motor vehicle manufactured using such a method.

4 Claims, 1 Drawing Sheet

(51) Int. Cl.
*C22C 21/06* (2006.01)
*C21D 1/60* (2006.01)
*C21D 1/613* (2006.01)
*C21D 9/52* (2006.01)
*C22C 21/08* (2006.01)
*C23F 1/36* (2006.01)
*C25D 11/16* (2006.01)
*C21D 8/02* (2006.01)
*C25D 11/24* (2006.01)

(52) U.S. Cl.
CPC ......... *C21D 8/0236* (2013.01); *C21D 8/0263* (2013.01); *C21D 8/0273* (2013.01); *C21D 9/52* (2013.01); *C22C 21/06* (2013.01); *C22C 21/08* (2013.01); *C22F 1/047* (2013.01); *C23F 1/36* (2013.01); *C25D 11/16* (2013.01); *C25D 11/246* (2013.01)

(56) References Cited

OTHER PUBLICATIONS

Cotell et al. Surface Engineering of Aluminum and Aluminum Alloys. ASM Handbook, vol. 5: Surface Engineering. pp. 784-804. Copyright 1994. (Year: 1994).*
International Search Report from corresponding PCT/IB2014/001583, dated Dec. 1, 2014.

* cited by examiner

MOTOR VEHICLE MOULDING RING MADE FROM ALUMINIUM/MAGNESIUM ALLOY

CROSS REFERENCE TO RELATED APPLICATIONS

This application is a § 371 National Stage Application of PCT/IB2014/001583, filed 13 Jun. 2014, which claims priority to FR 13/01401, filed 17 Jun. 2013.

BACKGROUND

Field of the Invention

The invention relates to the field of decorative trim strips for automobiles made of aluminum alloy for use primarily on the outside of bodywork, such as in particular window surrounds, side moldings on body shells or doors, trim for tailgates, hubcaps and bumper trim strips.

The invention relates more particularly to aluminum alloy plates of the AA5xxx series with a composition and heat treatment that are particularly suitable for this type of application and offering, after shaping and brightening, excellent resistance to corrosion in particular to the increasingly alkaline solutions that make up the detergents that are used particularly in automatic carwashes.

Description of Related Art

Aluminum alloys are commonly used in the manufacture of bright decorative parts for the automotive industry in competition with steel and plastics.

Such is the case in particular for trim strips for the outside of bodywork, such as window surrounds, side moldings on body shells or doors, trim for tailgates, grilles and bumper trim strips.

All aluminum alloys discussed in the following are designated, unless otherwise stated, according to the designations defined by the "Aluminum Association" in the "Registration Record Series" that it publishes regularly.

Two types of products are currently available on the market: extruded profiles and shaped plates, before the anodizing/brightening treatment.

For the first, so-called high purity AA6xxx series alloys are mainly used, and particularly type AA6401.

For the second, in North America, the predominant types are AA3xxx and 8xxx alloys, while in Europe, high purity alloy of the AA5xxx series are mainly used.

However, these are judged by motor vehicle manufacturers to be less efficient than products made from profiles of the AA6xxx series, particularly in terms of corrosion resistance in strongly alkaline media.

Among the main parameters of the specification of this type of bright plate are a certain mechanical strength, good formability, and especially a good capability for brightening and anodizing, and maintaining the appearance obtained without deterioration throughout the life of the vehicle.

This parameter has become particularly important with the recent developments in automatic carwash detergents, with a move to more alkaline solutions, i.e. above the pH at which the final anodic layer is stable and which can lead to a loss of brightness that is ultimately prohibitive.

For this reason, qualification tests have been developed by motor vehicle manufacturers to differentiate between the different products (alloys, processing mode and surface treatment).

The most widespread, known as the "carwash test" involves partially immersing a sample of the final product in a highly alkaline solution, i.e. a pH of 11 to 14, for 10 minutes, then visually determining the loss or otherwise of brightness after cleaning of etching products.

The exact experimental procedure is described below in the section "subject of the invention". The aqueous alkaline solution most recently used consists of 12.5 g/l of NaOH, 4.64 g/l of $Na_3PO_4$—$12H_2O$ and 0.33 g/l of NaCl. Its pH measured as during the tests reported in the section "Examples" was 13.5.

In order to quantify the results, one may, in addition, measure the weight loss of samples during the operation.

The main work on this topic has focused primarily on the conditions of brightening surface treatment and especially final anodization to increase the resistance of the anodic layer to these very aggressive solutions. This is particularly true of the study by L. E. Cohen and J. A. Hook reported in "Corrosion of anodized aluminum by alkaline cleaners: Causes and cures", Plat. Surf. Finish, 74(2), 1987, p. 73-76.

The effectiveness of the addition of silicate or transition metal salts during the sealing step has been demonstrated in particular by S. Jolivet in "Colmatage résistant aux milieux alcalins" (*Sealing resistant to alkaline media*), Symposium on the Surface Treatment of Aluminum Alloys, CETIM/CERTEC, 2008. It was also the subject of application EP 1873278 A1 "Silicate treatment of sealed anodised aluminium" filed in 2006 by Henkel KGAA.

Other studies have also focused on the influence of the geometry of the oxide layer, such as those of R. Steins et al. reported in "High performance anodized layers", European Aluminium Congress, 2009.

Finally, the latest solutions focus on the application of a layer of silane-based sol-gel on the anodic layer, which greatly increases the resistance of the final product. They were the subject of request WO 2009/068168 "Component made of Al alloy having very high corrosion resistance and method for the production thereof", filed in 2008 by Erbslöh AG.

In fact, little research focuses on the metallurgical influence of the substrate, although differences have been observed, as mentioned above, between alloys of series AA5xxx and AA6xxx. The alloys used to date in Europe come generally from very pure bases (Al99.9Mg or Al99.7Mg and Al99.9MgSi) such as alloys of types AA5657 or even AA5505 or AA5210 for plates of the AA5xxx series and type AA6401 for profiles of the AA6xxx series.

The rolled product or plate is usually supplied in the annealed condition, known by the name of "H2x" in order to guarantee minimum strength but still with sufficient formability for the forming step, followed by the steps of brightening and anodizing.

The extruded product is usually delivered in metallurgical temper T4 (solution heat-treated and quenched) or T6 (solution heat-treated, quenched and aged) in a form similar to that of the final product.

The Problem

The invention aims to provide a laminated product of the AA5xxx series which, when developed and transformed under certain conditions, achieves a performance similar to an extruded product of the AA6xxx series in terms of conservation of its brightness in contact with a strongly alkaline solution, or one at pH values from 11 to 14, while maintaining satisfactory mechanical strength and sufficient formability of the plate or strip used to prepare the final product.

SUMMARY

The invention relates to a method of manufacturing an outside decorative trim strip of motor vehicles, such as window surrounds or body shell trim, made of aluminum alloy by shaping and brightening of a plate or strip made according to the following successive steps:

Direct Chill (DC) casting of a slab made of an alloy of the AA5xxx series of high purity, i.e. a composition such that (as a percentage by weight): Mg≤1.1, Cu≤0.10, other elements ≤0.30, the rest aluminum.

Heating the plate to a temperature of 480 to 530° C. for at least 1 h, hot rolling to a thickness of typically 5 to 30 mm, and cooling followed by cold rolling including intermediate annealing in a continuous tunnel furnace, or holding between the solvus temperature and the alloy incipient melting temperature typically for 3 seconds to 5 minutes, followed by quenching in air or water prior to final cold rolling with a reduction rate of 15 to 70% to a thickness of 0.4 to 1.5 mm.

To facilitate the subsequent shaping of the plate or strip, annealing at a temperature of 100 to 200° C. for a time ranging from 3 to 15 h at 170° C. may be performed. According to a preferred embodiment, the composition of the plate is of the AA5657 type or (as a percentage by weight):

Si: ≤0.08, Fe: ≤0.10, Cu: ≤0.10, Mn: ≤0.03, Mg: 0.6-1.0, Zn: ≤0.05, Ti: ≤0.020, other elements <0.05 each, and <0.15 in total, the rest aluminum.

In another embodiment of the invention, the composition of the plate is the AA5205 type, or (as a percentage by weight):

Si: ≤0.15, Fe: ≤0.7, Cu: 0.03-0.10, Mn: ≤0.10, Mg: 0.6-1.0, Zn: ≤0.05, Ti: ≤0.05, other elements <0.05 each, and <0.15 in total, the rest aluminum.

In another embodiment, the alloy plate is a high-purity alloy of the AA5xxx series, with a composition such that (as a percentage by weight): Mg≤1.1, other elements ≤0.10, the rest aluminum.

DETAILED DESCRIPTION OF A PREFERRED EMBODIMENT

Figure 1:
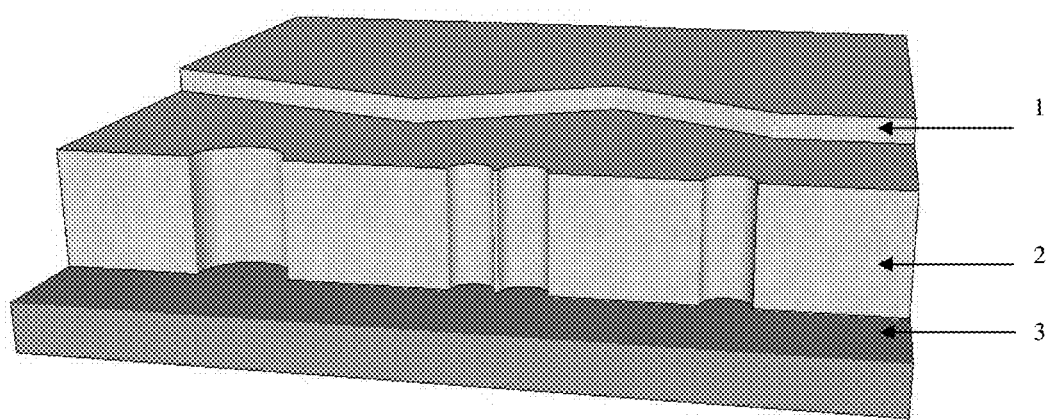
FIGS. 1-2 depict embodiments of the disclosure described herein.

According to this embodiment, the composition of the plate is of the AA5505 type or (as a percentage by weight):

Si: ≤0.06, Fe: ≤0.04, Cu≤0.01, Mn: ≤0.03, Mg: 0.8-1.1, Zn: ≤0.03, Ti: ≤0.010, other elements <0.05 each, and <0.10 in total, the rest aluminum.

Still according to this embodiment, the composition of the plate is of the AA5210 type or (as a percentage by weight):

Si: ≤0.06, Fe: ≤0.04, Cu: ≤0.01, Mn: ≤0.03, Mg: 0.35-0.60, Zn: ≤0.03, Ti: ≤0.020, other elements <0.05 each, and <0.10 in total, the rest aluminum.

The duration of the intermediate annealing, i.e. holding between the solvus temperature and the incipient melting temperature of the alloy is preferably between 5 s and 2 min and in an advantageous embodiment, the temperature of the intermediate annealing is between 450 and 550° C.

The invention also comprises a decorative trim strip made according to a method such as described above and chosen among the group comprising window surrounds, side moldings on body shells or trim for tailgates, decorative trims for grilles and bumper trim strips.

It also relates a decorative trim strip manufactured by a method according to one or more of the embodiments mentioned above, characterized in that:

after brightening of the plate or strip, comprising the steps of conventional degreasing, electro-brightening in a phospho-sulfuric acid medium, typically at 75° C. and with a DC voltage of 25V, rinsing, alkaline etching typically at 50° C., desmutting at ambient temperature, rinsing, anodizing in a sulfuric acid medium in direct current, typically at 21° C., sealing pores in two steps: cold with nickel then in hot water, (i.e. pre-sealing in a solution of nickel acetate at ambient temperature and followed by boehmitage in boiling water), followed by a test known to experts in the field as the "carwash test", namely: acid etching for 10 min. in a solution of pH 1, or an aqueous solution containing 0.1 mol HCl/liter, rinsing, drying by holding for 1 h at 40° C., immersing for 10 minutes in an alkaline solution at pH 11 to 14, typically as described above, rinsing, drying and wiping with a polishing cloth, no loss of brightness is observed visually.

According to another advantageous feature, said decorative trim strip manufactured by a method according to one or more of the embodiments mentioned previously is characterized in that:

after brightening of the plate or trim comprising the steps of conventional degreasing, electro-brightening in a phospho-sulfuric acid medium, typically at 75° C. and with a DC voltage of 25V, rinsing, alkaline etching typically at 50° C., desmutting at ambient temperature, rinsing, anodizing in a sulfuric acid medium in direct current, typically at 21° C., sealing pores in two steps: cold with nickel then in hot water, followed by a test known to experts in the field as the "carwash test", namely: acid pickling for 10 min in a solution of pH 1, rinsing, drying by holding for 1 h at 40° C., keeping immersed for 10 min in an alkaline solution at pH 11 to 14, rinsing, drying and wiping with a polishing cloth, the weight loss measured on specimens cut from said plate or strip does not exceed 40 mg/dm$^2$ of immersed surface.

FIG. 1 is a diagram representing a cross-sectional observation of the anodic layer of a sample of aluminum after immersing for 10 min. in an alkaline solution at pH 11 to 14, as described above. The anodic layer (1+2) has a standard thickness of 5-6 μm. Approximately 1 μm (1) is attacked by chemical dissolution after the 10 min. test. The rest of the anodic layer (2) has attack channels throughout the thickness of the layer and etching of the underlying metal is sometimes observed (3). Channel size is about one hundred nm.

Figure 2:
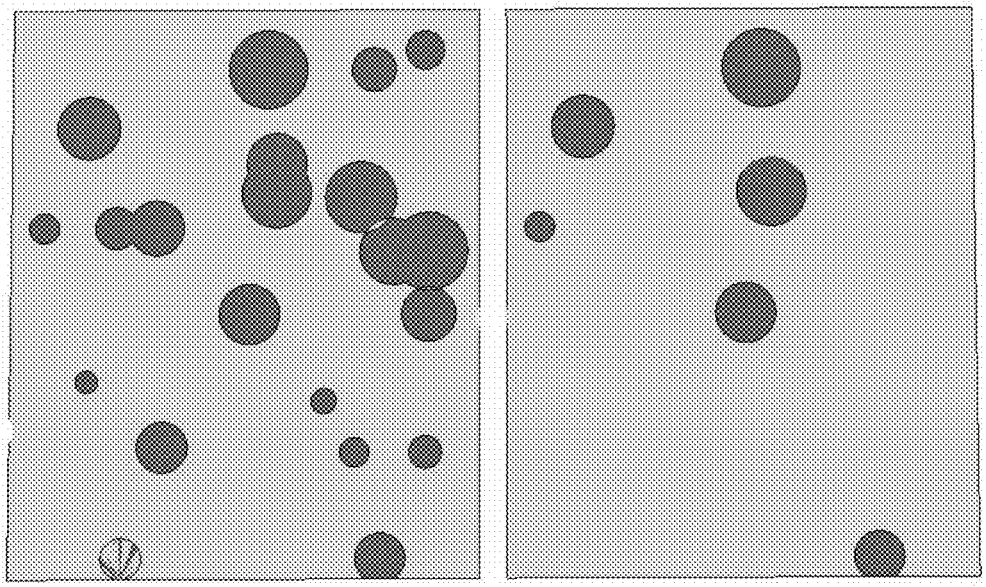

FIG. 2 is a diagram representing the surface of the sample observed in a scanning electron microscope after 10 min of alkaline attack for samples 5505 H22 on the left and 6401 T6 on the right. The diagram shows an identical observation surface for both samples. The density of defects can therefore be compared directly. It is clear from this diagram that a poor reaction to the alkaline test leads to higher density of defects as shown for sample 5505 H22 compared to sample 6401 T6.

The invention consists in a judicious choice of alloy and heat treatment, together with fabrication process parameters, of the plate or strip used for making trim strips for the outside of motor vehicles subjected to a severely corrosive environment such as that of detergents in carwashes, consisting of highly alkaline solutions at a pH of 11 to 14, in any case above the pH for stability of the anodic layer, which allows it to preserve its brightness throughout the life of the vehicle, while maintaining satisfactory mechanical strength and adequate formability.

It is based on the observation by the applicant that in contact with a strongly alkaline solution, i.e. a pH of 11 to 14, such as that commonly used by motor vehicle manufacturers in their qualification tests, etching of the anode layer takes place according to two distinct modes. This is evident in FIG. 1, a view taken with a scanning electron microscope of a section of the anode layer with a thickness of 5 to 6 µm, after immersion for ten minutes in such an alkaline solution:

The first mode (1) is a relatively slow and uniform chemical dissolution of the sealed oxide film, while the second (2) corresponds to a rapid and localized attack of the anodic layer and the underlying metal and results in the formation of narrow tunnels through the oxide layer.

The applicant also noted that the homogeneous attack of the oxide layer according to the first mode was relatively independent of the type of alloy and its metallurgical temper; on the contrary: the degree of localized attack through the oxide layer does greatly depend on the alloy and its metallurgical temper.

This has a pronounced effect in the case of different alloys of series AA5xxx tested, whereas this effect does not appear to be significant in the case of alloys of series AA6xxx.

This difference in behavior is attributed to a localized attack density that is significantly lower in favorable cases compared to the worst cases. It is illustrated in FIG. 2 which shows images obtained by scanning electron microscopy at the same magnification for both samples after immersion for ten minutes in the alkaline solution at pH 11 to 14: The left-hand image is an AA5505 type alloy after cold rolling and final annealing at a temperature of 250° C. for 1 h (temper H22) leading to a poor behavior, while the right-hand image is an extruded AA6401 alloy, temper T6 (quenched and aged) leading to favorable behavior.

To date, no industrial solution is known to improve the behavior of AA5xxx series alloy plates as compared with profiles made with AA6xxx series alloys.

As the applicant had noted this difference in behavior between alloys of series 5xxx and series 6xxx during qualification tests known as "carwash tests", including the one described in the examples, and because of the above observations, he saw it not as behavior intrinsic to a type of alloy, but as being related to the method of manufacture of the product.

More specifically, the poor behavior of AA5xxx series alloys was attributed to the precipitation of the $Mg_2Si$ phase during the final annealing treatment. The applicant therefore sought the solution to the problem in a more appropriate method of production that would take into account the influence of the precipitation of fine particles of the $Mg_2Si$ phase during the final annealing treatment, but also in all intermediate annealing, particularly during cold rolling.

It turned out that the solution lay in intermediate annealing during cold rolling, of the "flash" type: in a continuous tunnel furnace at a temperature between the solvus temperature and the incipient melting temperature of the alloy, typically for 3 seconds to 5 minutes, followed by quenching in air or water, before final cold rolling, during which the mechanical strength is improved by work-hardening.

Moderate additional annealing, i.e. at a temperature of 100 to 200° C. for a time equivalent to 3 to 15 h at 170° C. may be performed if necessary to facilitate the subsequent shaping of the plate or strip.

Equivalent time t(eq) is defined by the formula:

$$t(eq) = \frac{tref * \exp(-15692/Tref)}{\exp(-15692/T_{eq})}$$

where T (in K) is the temperature and t the annealing time, $T_{ref}$ being a reference temperature of 443K or 170° C. and tref being the said reference time between 3 h and 15 h.

The alloys of the invention are so-called high purity alloys of the AA5xxx series, such as those used for the development of bright plates (called "high gloss" alloys), and obtained from very pure bases (A199.9Mg or A199.7Mg) or the 5xxx series alloys of chemical composition expressed in percentages by weight such that: Mg<1.1, Cu<0.10, other elements <0.30, the remainder being aluminum, or, even purer, of chemical composition such that: Mg≤1.1, other elements ≤0.10, the rest aluminum.

In the first case, mention may be made of the AA5657 type alloy, of chemical composition, expressed as percentages by weight: Si: ≤0.08, Fe: ≤0.10, Cu: ≤0.10, Mn: ≤0.03, Mg: 0.6-1.0, Zn: ≤0.05, Ti: ≤0020, other elements <0.05 each and <0.15 total, the rest aluminum, or the alloy of type AA5205, of chemical composition, expressed percentages by weight: Si: ≤0.15, Fe: ≤0.7, Cu: 0.03-0.10, Mn: ≤0.10, Mg: 0.6-1.0, Zn: ≤0.05, Ti: ≤0.05, other elements <0.05 each, and <0.15 in total, the rest aluminum.

In the latter case mention may particularly be made of the AA5505 alloys, of composition (as a percentage by weight): Si: ≤0.06, Fe: ≤0.04, Cu≤0.01, Mn: ≤0.03, Mg: 0.8-1.1, Zn: ≤0.03, Ti: ≤0010, other elements <0.05 each and <0.10 in total, the rest aluminum, or the alloy of type AA5210, of chemical composition, as a percentage by weight: Si: ≤0.06, Fe: ≤0.04, Cu: ≤0.01, Mn: ≤0.03, Mg: 0.35-0.60, Zn: ≤0.03, Ti: ≤0.020, other elements <0.05 each, and <0.10 in total, the rest aluminum.

The manufacture of plates according to the invention mainly comprises casting, typically DC casting of plates and scalping them.

The scalped plates are then subjected to heating for more than one hour at a temperature of 480 to 530° C. and then hot rolling to a thickness of typically 5 to 30 mm, before cooling.

It then undergoes cold rolling as mentioned above in which the product undergoes intermediate annealing at a temperature between the solvus temperature and the alloy incipient melting temperature, or typically between 450 and 550° C.

After this annealing, cold rolling is resumed with a reduction rate of 15-70% to a final thickness of 0.4 to 1.5 mm.

Finally, the plates or strips obtained are subjected, if necessary, to the final annealing mentioned above.

The details of the invention will be understood better with the help of the examples below, which are not, however, restrictive in their scope.

EXAMPLES

Example 1

An AA5657 alloy plate was cast by Direct Chill (DC) casting. Its composition (as a percentage by weight) was:
Si: 0.06, Fe: 0.06, Cu: 0.04, Mg: 0.76, Mn: ≤0.03, Zn: ≤0.05, Ti: ≤0.020, other elements <0.05 each, and <0.15 in total, the rest aluminum.

The plate was heated for 1 hour at a temperature of 490° C. and then hot rolled to a thickness of 7.5 mm, and cooled before cold rolling without intermediate annealing to a thickness of 0.7 mm.

Finally, the resulting plate was subjected to final annealing for 1 h at a temperature of 260° C.

Two samples of the coil (A and B in summary Table 1 at the end of the "Examples" section) were collected to undergo brightening and anodizing treatment followed by the qualification test of the "carwash test" type, both as mentioned above.

The amount of weight lost during the test expressed in mg/dm$^2$ of immersed surface for an immersion time of 10 minutes are given in Table 1 below. Both samples A and B lead to a similar result: values of 54 and 58 mg/dm$^2$.

To evaluate the idea underlying the invention, namely that the negative behavior of the AA5xxx series alloys was due to the precipitation of the Mg$_2$Si phase during the final annealing heat treatment, heat treatment (called "Simulation" in table 1) was performed on a 0.7 mm thick laboratory sample C in the final annealed state to dissolve any Mg$_2$Si particle which might have precipitated during the transformation range by conventional solution heat treatment.

It was assumed in this example (and this is validated by the following examples) that the cold strain hardening and final annealing of the invention did not lead to the precipitation of Mg$_2$Si.

Sample C treated in this way underwent the full cycle of brightening/anodizing and the alkaline test of the "carwash test" type, both as mentioned above.

The weight loss after an immersion time of 10 minutes is 24 mg/dm$^2$, which is consistent with the claimed characteristic.

Samples A, B, outside the invention, and C, simulating the invention were also evaluated visually and no loss of brightness was found on sample C, unlike the two samples A and B.

This example validates the positive effect of intermediate annealing according to the invention.

Example 2

An AA5657 alloy plate was cast by Direct Chill (DC) casting. Its composition (as a percentage by weight) was identical to that of example 1.

The plate was also heated for 1 hour at a temperature of 490° C. and then hot rolled to a thickness of 6.5 mm, and cooled before cold rolling to a thickness of 1.09 mm.

The coil was then subjected to intermediate annealing in a batch type furnace for 8 hours at a temperature of 360° C.

Cold rolling was then resumed down to the final thickness of 0.42 mm.

Finally, the resulting coil was subjected to final annealing for 2.5 h at a temperature of 170° C.

This is a range with intermediate annealing outside the invention.

A sample (D in Table 1) was then taken to undergo brightening and anodizing treatment followed by a qualifying test of the "carwash test" type, again as mentioned above. The weight loss after an immersion time of 10 minutes is 75 mg/dm$^2$, which is well above the claimed value of 40 mg/dm$^2$.

Sample D was also assessed visually and showed significant loss of brightness after the test.

Example 3

An AA5505 alloy plate was cast by Direct Chill (DC) casting. Its composition (as a percentage by weight) was: Si: 0.03, Fe: 0.03, Cu: ≤0.01, Mg: 0.88, Mn: ≤0.03, Zn: ≤0.03, Ti: ≤0.010, other elements <0.05 each, and <0.10 in total, the rest aluminum.

The plate was also heated for 1 hour at a temperature of 490° C. and then hot rolled to a thickness of 0.30 in, and cooled before cold rolling to a thickness of 0.09 in.

The coil was then subjected, according to the invention, to intermediate annealing in a continuous furnace at 500° C. with a holding time of 23 s above the solvus temperature of the alloy, followed by air quenching.

Cold rolling was then resumed to give the final thickness of 1.6 mm Another coil, of the same alloy and processed identically but without intermediate annealing, was also produced. The latter underwent final annealing at a temperature of 250° C. for 1 h.

Samples (F and G for the first and for the second E) were taken from each coil, to undergo brightening and anodizing treatment followed by qualifying test of the "carwash test" type, again as mentioned above.

The weight losses after an immersion time of 10 minutes are presented in table 1 below.

These results demonstrate the improved behavior of the metal produced with intermediate annealing according to the invention, here without final annealing (F at 30 and G at 29 mg/dm$^2$), relative to the one, outside the invention, produced without intermediate annealing (E at 58 mg/dm$^2$).

Samples F, G, with intermediate annealing and according to the invention, here without final annealing, and E, outside the invention, produced without intermediate annealing, were also assessed visually and no loss of brightness was observed on samples F and G unlike sample E, which showed a significant loss of brightness.

Example 4

An AA5505 alloy plate was cast by Direct Chill (DC) casting. Its composition (as a percentage by weight) was identical to that of example 3.

The plate was also heated for 1 hour at a temperature of 490° C. and then hot rolled to a thickness of 0.30 in, and cooled before cold rolling to a thickness of 0.07 in.

The coil was then subjected, according to the invention, to intermediate annealing in a continuous furnace at 520° C. with a holding time of 1 min above the solvus temperature of the alloy, followed by air quenching.

Cold rolling was then resumed down to the final thickness of 1.2 mm.

Finally, the resulting coil was subjected to final annealing for 3 h at a temperature of 170° C.

Samples were then taken before (H) and after (I) final annealing, to undergo brightening and anodizing treatment followed by a qualifying test of the "carwash test" type, again as mentioned above.

The weight losses after an immersion time of 10 minutes are similar: 26 and 27 mg/dm$^2$. Samples H and I, according to the invention, were also assessed visually and no loss of brightness was observed after the test.

TABLE 1

| Example | Sample | Alloy | Intermediate annealing | Final annealing | Wt. loss (mg/dm$^2$) |
|---|---|---|---|---|---|
| 1 | A | AA5657 | Non | 1 h - 260° C. | 58 |
| 1 | B | AA5657 | Non | 1 h - 260° C. | 54 |
| 1 | C | AA5657 | Non | Simulation | 24 |

TABLE 1-continued

| Example | Sample | Alloy | Intermediate annealing | Final annealing | Wt. loss (mg/dm²) |
|---|---|---|---|---|---|
| 2 | D | AA5657 | 8 h - 360° C. | 2.5 h - 170° C. | 75 |
| 3 | E | AA5505 | Non | 1 h - 250° C. | 58 |
| 3 | F | AA5505 | 23 s - 500° C. | Non | 30 |
| 3 | G | AA5505 | 23 s - 500° C. | Non | 29 |
| 4 | H | AA5505 | 1 min. - 520° C. | Non | 26 |
| 4 | I | AA5505 | 1 min. - 520° C. | 3 h - 170° C. | 27 |

The invention claimed is:

1. A manufacturing method of an outside decorative trim strip of a motor vehicle, wherein the strip is made of aluminum alloy, comprising
   (1) preparing a plate or strip made according to the following successive steps:
      a) direct chill (DC) casting of a slab made of an alloy of AA5xxx series consisting of, as a percentage by weight:
         Mg≤1.1, Cu≤0.10, other elements ≤0.30, the rest aluminum,
      b) heating the slab to a temperature of 480 to 530° C. for at least 1 h,
      c) hot rolling and cooling, and
      d) cold rolling including intermediate annealing in a continuous tunnel furnace, comprising holding between solvus temperature and alloy incipient melting temperature for 3 seconds to 5 minutes, followed by quenching in air or water, and
   (2) shaping and brightening the prepared plate or strip, wherein the brightening after d) comprises,
      e) degreasing the strip,
      f) electro-brightening the strip in a phospho-sulfuric acid medium,
      g) rinsing the strip,
      h) alkaline etching the strip,
      i) desmutting the strip at ambient temperature,
      j) rinsing the strip,
      k) anodizing the strip in a sulfuric acid medium in direct current, and
      l) sealing pores in two steps: pre-sealing in a solution of nickel acetate at ambient temperature followed by immersion in boiling water.

2. The method according to claim 1, wherein in f), electro-brightening is at 75° C. and with a DC voltage of 25V.

3. The method according to claim 1, wherein in h), alkaline etching is at about 50° C.

4. The method according to claim 1, wherein in k), anodizing is at about 21° C.

* * * * *